(12) United States Patent
Riepshoff

(10) Patent No.: US 8,661,018 B2
(45) Date of Patent: Feb. 25, 2014

(54) DATA SERVICE RESPONSE PLAN GENERATOR

(75) Inventor: Robert D. Riepshoff, Troy, IL (US)

(73) Assignee: Lockheed Martin Corporation, Bethesda, MD (US)

( * ) Notice: Subject to any disclaimer, the term of this patent is extended or adjusted under 35 U.S.C. 154(b) by 588 days.

(21) Appl. No.: 12/853,666

(22) Filed: Aug. 10, 2010

(65) Prior Publication Data

US 2012/0041942 A1    Feb. 16, 2012

(51) Int. Cl.
*G06F 17/30* (2006.01)
*G06F 17/00* (2006.01)

(52) U.S. Cl.
USPC .................................. 707/713; 707/718

(58) Field of Classification Search
USPC .................................. 707/713, 718
See application file for complete search history.

(56) References Cited

U.S. PATENT DOCUMENTS

| | | | |
|---|---|---|---|
| 5,794,193 A | 8/1998 | Gorin | |
| 5,860,063 A | 1/1999 | Gorin et al. | |
| 6,173,279 B1 | 1/2001 | Levin et al. | |
| 6,343,266 B1 | 1/2002 | Paul et al. | |
| 6,513,037 B1 | 1/2003 | Rüber et al. | |
| 6,615,172 B1 | 9/2003 | Bennett et al. | |
| 6,885,990 B1 | 4/2005 | Ohmori et al. | |
| 7,123,149 B2 * | 10/2006 | Nowak et al. | 340/572.1 |
| 7,386,449 B2 | 6/2008 | Sun et al. | |
| 2003/0065648 A1 * | 4/2003 | Driesch et al. | 707/2 |
| 2005/0010428 A1 | 1/2005 | Bergeron et al. | |
| 2005/0251527 A1 | 11/2005 | Phillips et al. | |
| 2006/0074726 A1 | 4/2006 | Forbes et al. | |
| 2006/0277082 A1 | 12/2006 | Behrendt et al. | |
| 2007/0016897 A1 | 1/2007 | Todd | |
| 2007/0106773 A1 | 5/2007 | Gallino et al. | |
| 2007/0129977 A1 | 6/2007 | Forney | |
| 2008/0021753 A1 | 1/2008 | Cummins | |
| 2008/0086391 A1 | 4/2008 | Maynard et al. | |
| 2008/0109276 A1 | 5/2008 | Ionfrida et al. | |
| 2008/0235199 A1 * | 9/2008 | Li et al. | 707/4 |
| 2009/0028051 A1 | 1/2009 | Dyke et al. | |
| 2009/0112672 A1 | 4/2009 | Flämig et al. | |
| 2009/0144077 A1 | 6/2009 | Hobbs et al. | |

FOREIGN PATENT DOCUMENTS

EP    0177854 A1    4/1986

* cited by examiner

*Primary Examiner* — Yicun Wu
(74) *Attorney, Agent, or Firm* — Ronald E. Prass, Jr.; Prass LLP

(57) ABSTRACT

A method, a service optimization system, and a set of instructions are disclosed. A user interface 150 may receive a data request 230 from a user 210. A service plan generation module 410 may generate in real time a preliminary data response plan 300 based upon the data request 230. A service optimization module 412 may create in real time an optimized data response plan 350 by reorganizing the preliminary data response plan 300 into a new order of execution to optimize a response time for the data response 414.

19 Claims, 7 Drawing Sheets

200

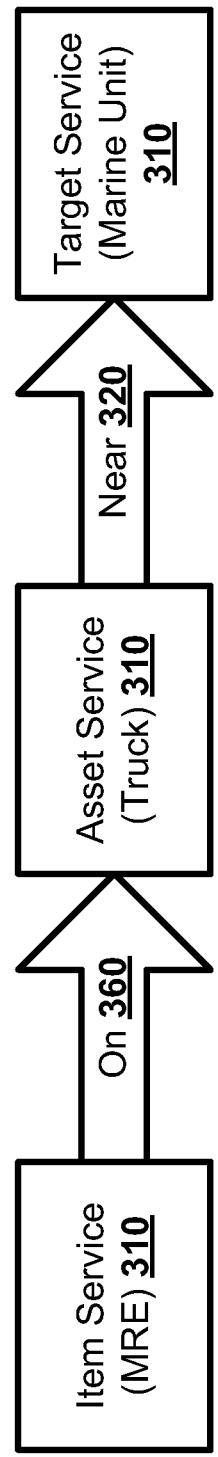

DATA SERVICE RESPONSE PLAN GENERATOR

FIELD OF THE INVENTION

The present invention relates to a method and system for generating a data service response plan. The present invention further relates to reorganizing and optimizing a data service response plan to more efficiently produce a data service response.

INTRODUCTION

Currently, a user may seek data that incorporates multiple interlocking data services. A data service is a service that monitors and maintains data relating to a specific group. Each data service may have a specific relationship to other data services. The interactions between each data service may be referred to as a data cloud.

For an example of a data cloud, a first data service may monitor a troop movement, a second data service may monitor the number and placement of a meal ready to eat (MRE), and a third data service may monitor a truck convoy. A user may want to know which set of MREs are being carried on which truck convoy near which set of troops. Each data service may be queried to determine the proper response to the user.

SUMMARY OF THE INVENTION

A method, a service optimization system, and a set of instructions are disclosed. A user interface may receive a data request from a user. A service plan generation module may generate in real time a preliminary data response plan based upon the data request. A service optimization module may create in real time an optimized data response plan by reorganizing the preliminary data response plan into a new order of execution to optimize a response time for a data response.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIGS. 3a-b illustrates, in block diagrams, two embodiments of a data response plan.

DETAILED DESCRIPTION OF THE INVENTION

Figure 1:
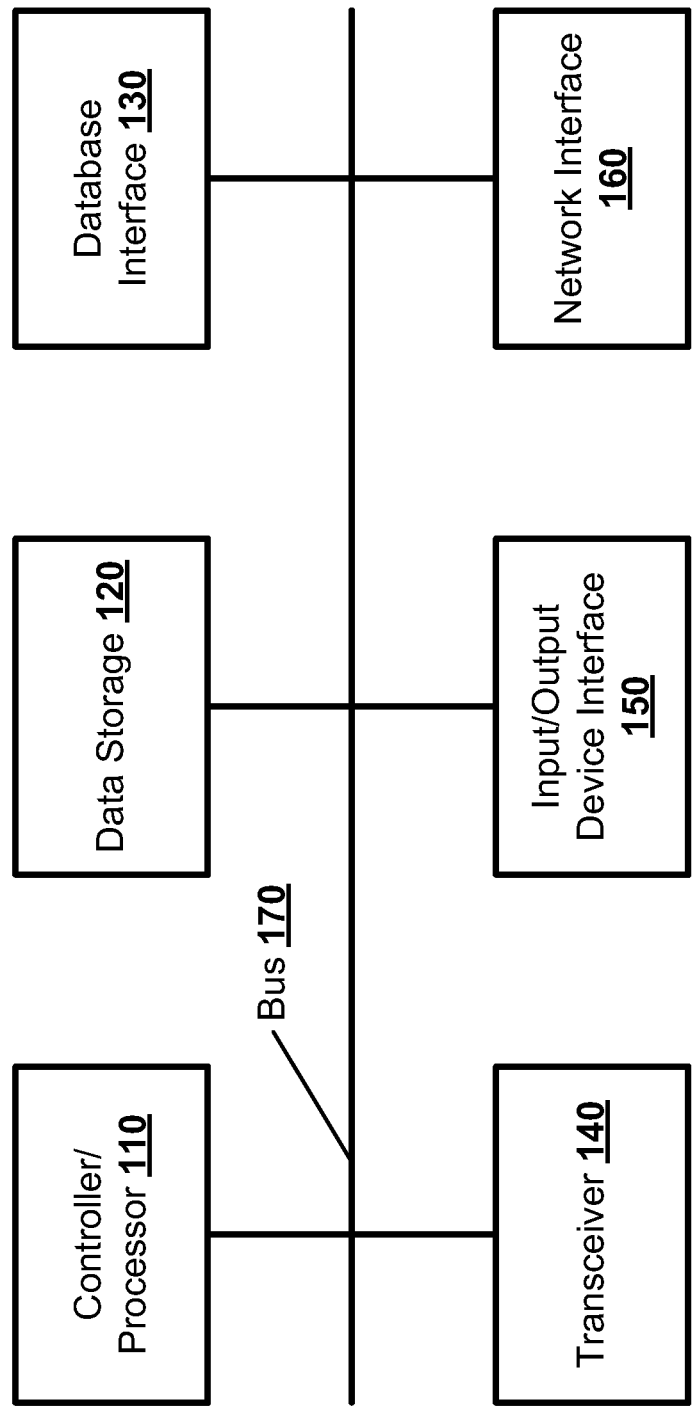
FIG. 1 illustrates, in a block diagram, one embodiment of a computing device.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an electronic device, and a set of instructions, and other embodiments that relate to the basic concepts of the invention. The electronic device may be any manner of computer, mobile device, wireless communication device, or general purpose electronic device. The set of instructions may reside in a storage medium. The set of instructions may be executable by a processor to implement a method for providing a data response.

A method, a service optimization system, and a set of instructions are disclosed. A user interface may receive a data request from a user. A service plan generation module may generate in real time a preliminary data response plan based upon the data request. A service optimization module may create in real time an optimized data response plan by reorganizing the preliminary data response plan into a new order of execution to optimize a response time for a data response.

A user may make a data request that harvests data over multiple data services, with each data service having a specific relationship with another data service. For example, a transportation logistics manager at the pentagon may be looking for the number of meals ready to eat (MREs) near a marine unit deployed in the field. An item data service may track the MREs, a target data service may track the marine unit, and an asset data service may track the trucks conveying items for the Marine Corps. A data request may be formulated by first asking the target service where the marine unit is located, then asking the asset service which trucks are near the marine unit, and finally asking the item service which MREs are present on which trucks. Alternately, a data request may be formulated by first asking the item service which MREs are present on which trucks, then asking the target service where the marine unit is located, and finally asking the asset service which trucks are near the marine unit. A service optimization system may organize the data request to produce the timeliest data responses.

FIG. 1 illustrates a possible configuration of a computing system 100 to act as a service optimization system. The computing system 100 may include a controller/processor 110, a data storage 120, a database interface 130, a transceiver 140, input/output (I/O) device interface 150, and a network interface 160, connected through bus 170. The network server 100 may implement any operating system. Client and server software may be written in any programming language, such as C, C++, Java or Visual Basic, for example. The server software may run on an application framework, such as, for example, a Java® server or .NET® framework The controller/processor 110 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The data storage 120, or memory, may include volatile and nonvolatile data storage, including one or more electrical, magnetic or optical memories such as a random access memory (RAM), cache, hard drive, or other memory device. The memory 120 may have a cache to speed access to specific data. The memory 120 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 130 may be used by the controller/processor 110 to access the database. Further, the database may maintain data service access information.

The transceiver 140 may create a connection with a mobile device. The transceiver 140 may be incorporated into a base station 100 or may be a separate device.

The I/O device interface 150, or user interface 150, may be connected to one or more input devices that may include a keyboard, mouse, pen-operated touch screen or monitor, voice-recognition device, or any other device that accepts input. The user interface 150 may also be connected to one or more output devices, such as a monitor, printer, disk drive, speakers, or any other device provided to output data. The user interface 150 may receive a data task or connection criteria from a network administrator.

The network interface 160 may be connected to a communication device, modem, network interface card, a transceiver, or any other device capable of transmitting and receiving signals from the network. The network interface 160 may be used to connect a client device to a network. The network interface 160 may connect with at least a first data service and a second data service. The components of the network server 100 may be connected via an electrical bus 170, for example, or linked wirelessly.

Client software and databases may be accessed by the controller/processor 110 from memory 120, and may include, for example, database applications, word processing applications, as well as components that embody the disclosed functionality of the present invention. The network server 100 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 2:
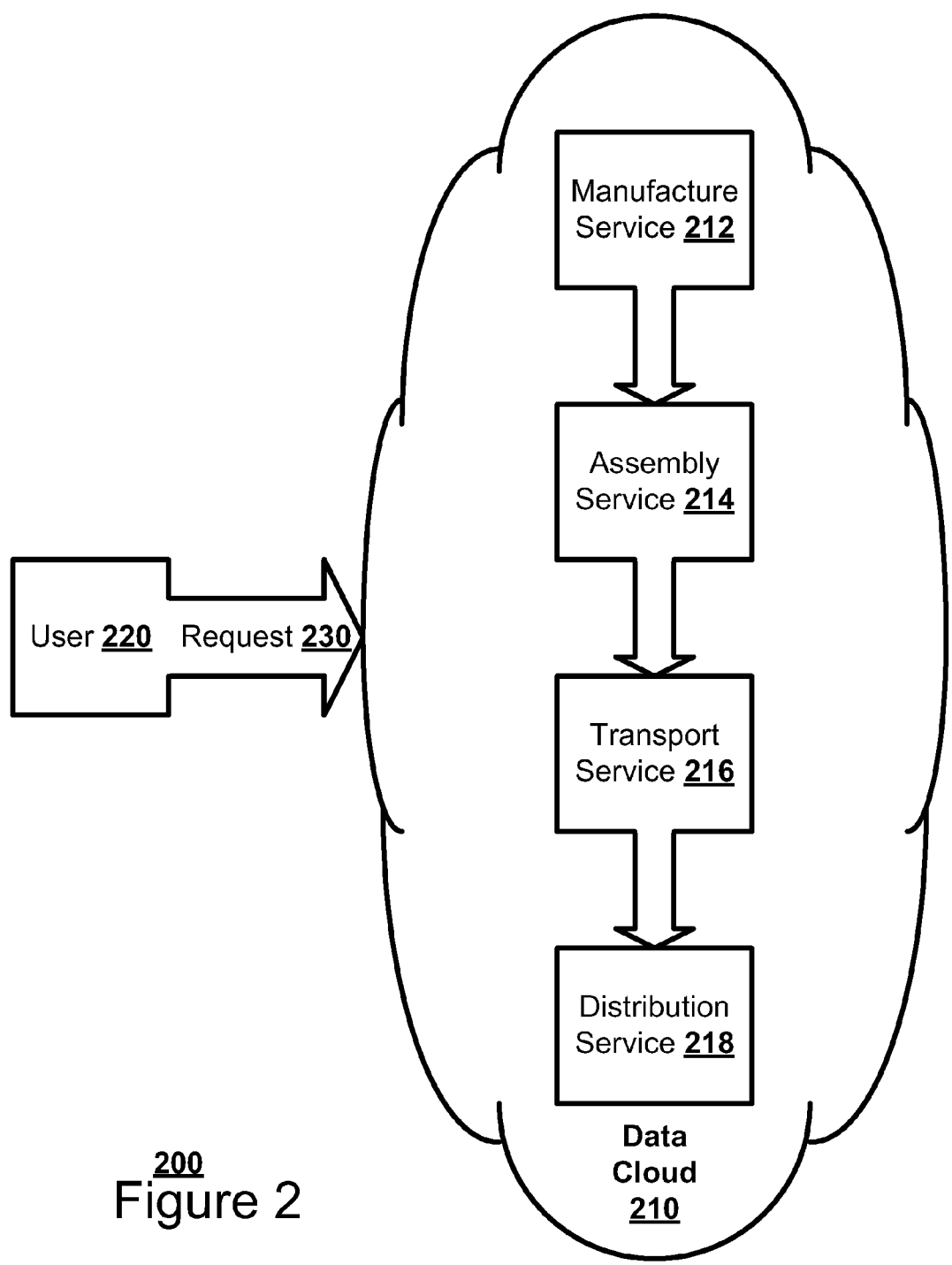
FIG. 2 illustrates, in a block diagram, one embodiment of a user interaction with a data cloud.

FIG. 2 illustrates, in a block diagram, one embodiment of a data interaction 200 with a data cloud 210. A data cloud 210 is a collection of interacting data services. The data services may be part of a manufacturing or distribution chain. For example, a product sales chain may have a manufacture service 212 that monitors creation of a product part, an assembly service 214 that monitors assembly of the product part into a product, a transport service 216 that monitors transportation of the product from an assembly point to a distribution point, and a distribution service 218 that monitors the product at the distribution point. A user 220 may send a data request 230 to a data cloud 210 to discover the location of a product or a product part.

FIG. 3*a* illustrates, in block diagrams, one embodiment of a preliminary data response plan 300. The preliminary data response plan 300 may have one or more data services 310. A first data service 310 may be linked to a second data service 310 by a connector 320 describing a relationship between the first data service 310 and the second data service 310. For example, a preliminary data response plan 300 may have a first data service query to an asset data service 310 tracking truck convoys, a second data service query to an item data service 310 tracking MREs, and a third data service query to a target data service 310 tracking marine units. A first connector 320 may represent that the truck convoy carries an MRE. A second connector 320 may represent that the MRE is near a marine unit.

FIG. 3*b* illustrates, in block diagrams, one embodiment of an optimized data response plan 350. In the optimized data response plan 350, the order of the one or more data services 310 in the preliminary data response plan 300 may be reorganized into a new order of execution to optimize a response time for a data response. The first data service 310 may be linked to the second data service 310 by an altered connector 360 describing the new order of the relationship between the first data service 310 and the second data service 310. For example, a preliminary data response plan 300 may have a first data service query to an item data service 310 tracking MREs, a second data service query to an asset data service 310 tracking truck convoys, and a third data service query to a target data service 310 tracking marine units. The original connector 320 may represent that the MRE is near a marine unit. An altered connector 360 may represent that the MRE is on a truck convoy.

Figure 4:
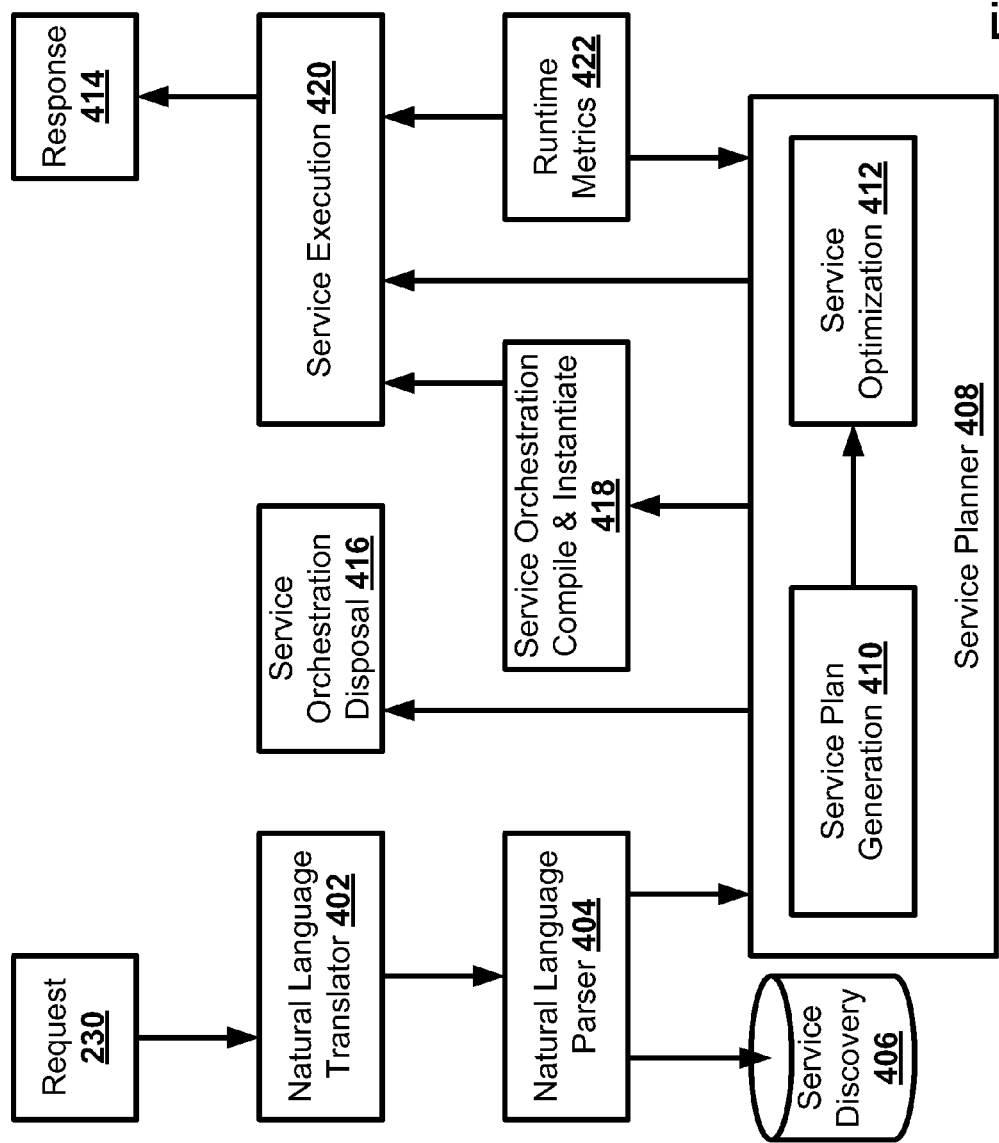
FIG. 4 illustrates, in a block diagram, one embodiment of a service optimization system.

FIG. 4 illustrates, in a block diagram, one embodiment of a service optimization system 400. The modules of the service optimization system 400 may be software modules, firmware modules, or hardware circuits. The service optimization system 400 may receive a natural language data request 230 from a user 220. A natural language translator 402 may translate the data request 230 from a natural language data request 230 to a Boolean data request. A natural language data request is structured like normal human speech. A Boolean data request has a binary logic structure. A natural language parser 404 may parse the data request 230 to be passed on to a service discovery database 406 and a service planner 408. The service planner 408 may have a service plan generation module 410 to create a preliminary data response plan 300 and a service optimization module 412 to create an optimized data response plan 350 in real time. The service optimization module 412 may reorganize the preliminary data response plan 300 into a new order of execution to optimize a response time for a data response 414. The service planner 408 may use a service orchestration disposal module 416 to dispose of aged optimized data response plans. The service planner 408 may send the optimized data response plans 350 to the service orchestration compile and instantiate module 418 to be compiled. The service orchestration compile and instantiate module 418 may instantiate the optimized data response plan 350 with a service execution module 420. The service planner 408 may also cache the optimized data response plan 350 with the service execution module 420. The service execution module 420 may execute the optimize data response plan 350 to produce a data response 414 for the user 220. A runtime metric module 422 may collect a runtime metric on the optimized data response plan 350. The service optimization module 412 may optimize reorganization of the preliminary data response plan 300 based on the collected runtime metric.

Figure 5:
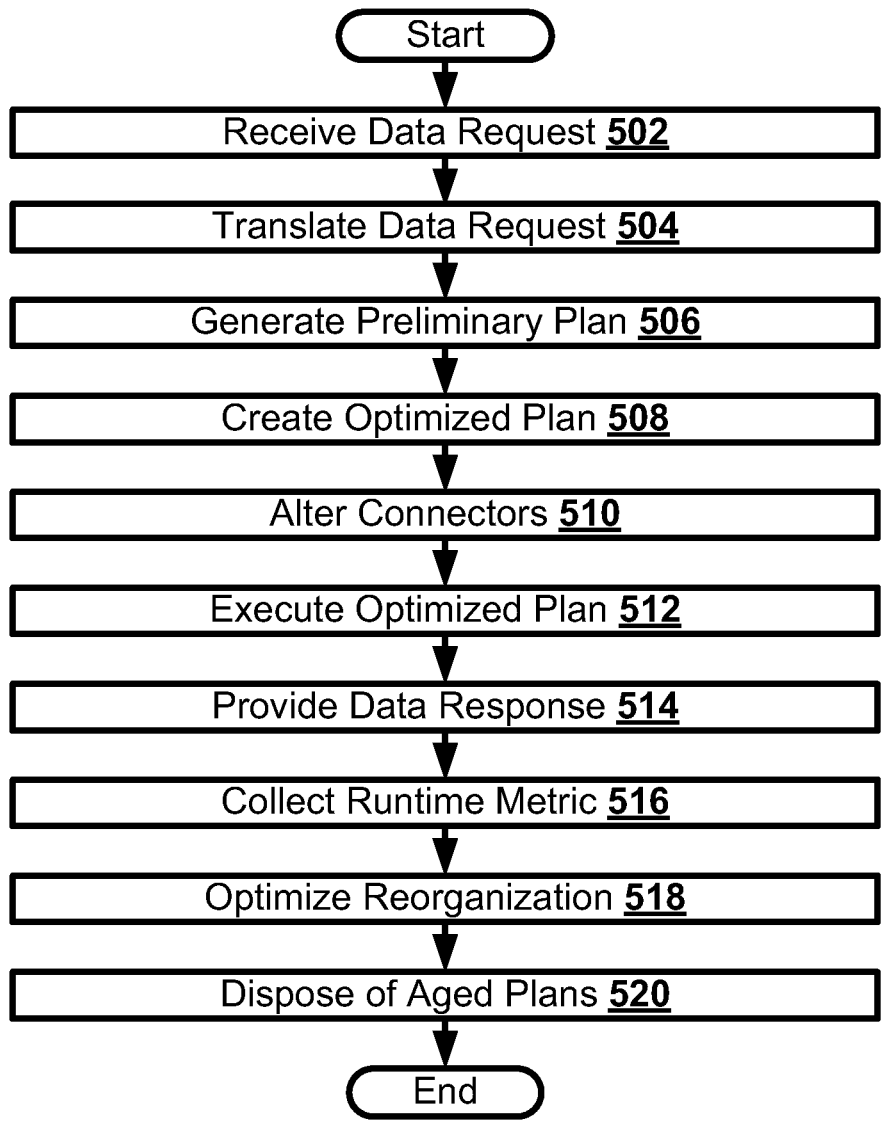
FIG. 5 illustrates, in a flowchart, one embodiment of a method for generating a data response.

FIG. 5 illustrates, in a flowchart, one embodiment of a method 500 for generating a data response. The service optimization system 400 may receive a data request 230 from a user 220 (Block 502). The natural language translator 402 may translate the data request 230 from a natural language data request to a Boolean data request (Block 504). The service plan generation module 410 may generate in real time a preliminary data response plan 300 based upon the data request 230 (Block 506). The service optimization module 412 may create in real time an optimized data response plan 350 by reorganizing the preliminary data response plan 300 into a new order of execution to optimize a response time for the data response 414 (Block 508). The service optimization module 412 may alter the connectors 320 of the preliminary data response plan 300 to reflect the new order (Block 510). The service execution module 420 may execute the optimized data response plan 350 (Block 512). The service optimization system 400 may provide a data response 414 to the user 220 (Block 514). The runtime metrics module 422 may collect one or more runtime metrics on the optimized data response plan 350 (Block 516). The service optimization module 412 may optimize a reorganization process based on the one or more runtime metrics (Block 518). The service orchestrate disposal module 516 may dispose of aged optimized data response plans (Block 520).

Figure 6:
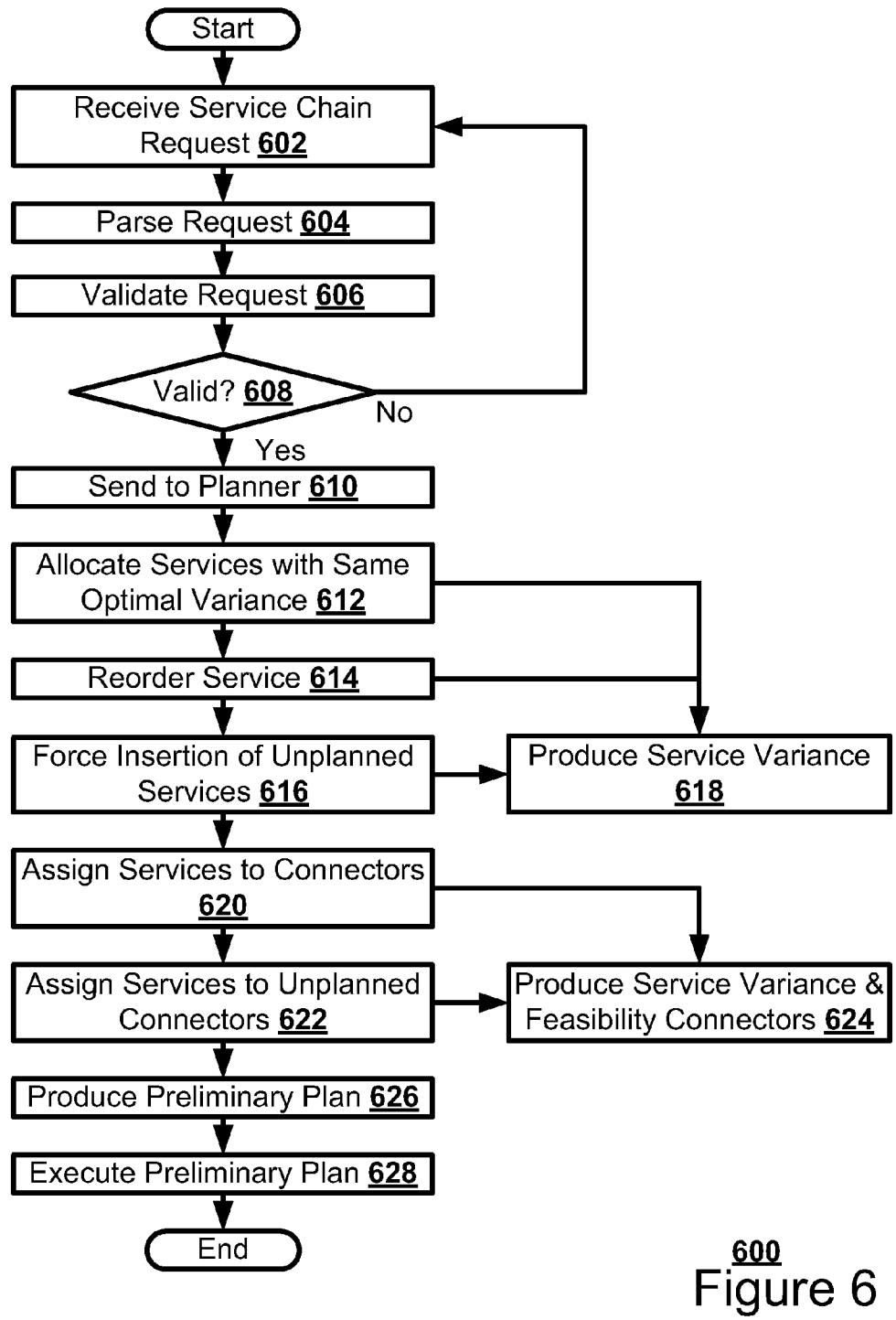
FIG. 6 illustrates, in a flowchart, one embodiment of a method for generating a preliminary data response plan.

FIG. 6 illustrates, in a flowchart, one embodiment of a method 600 for generating a preliminary data response plan. The natural language parser 404 may receive a service chain request from a natural language translator 402 (Block 602). The natural language parser 404 may parse the service chain request (Block 604). The natural language parser 404 may validate the service chain request (Block 606). If the service chain request is not valid (Block 608), the service optimization system 400 may await the next service chain request (Block 602). If the service chain request is valid (Block 608), the natural language parser 404 may send the service chain request to a service planner 408 (Block 610). The service plan generation module 410 may allocate data services 310 with the same optimal variance (Block 612). The service plan generation module 410 may reorder the data services 310 (Block 614). The service plan generation module 410 may force the insertion of any unplanned services (Block 616). These actions may result in the production of a service variance, or data service chain (Block 618). The service plan generation module 410 may assign each data service 310 to a connector 320 (Block 620). The service plan generation module 410 may assign a data service 310 to any unplanned connector (Block 622). The actions may result in the production of a service variance and feasibility connectors, or connectors (Block 624). The service plan generation module 410 may produce a preliminary data response plan 300 (Block 626). The service execution module 420 may then execute the preliminary data response plan 300 (Block 628).

Figure 7:
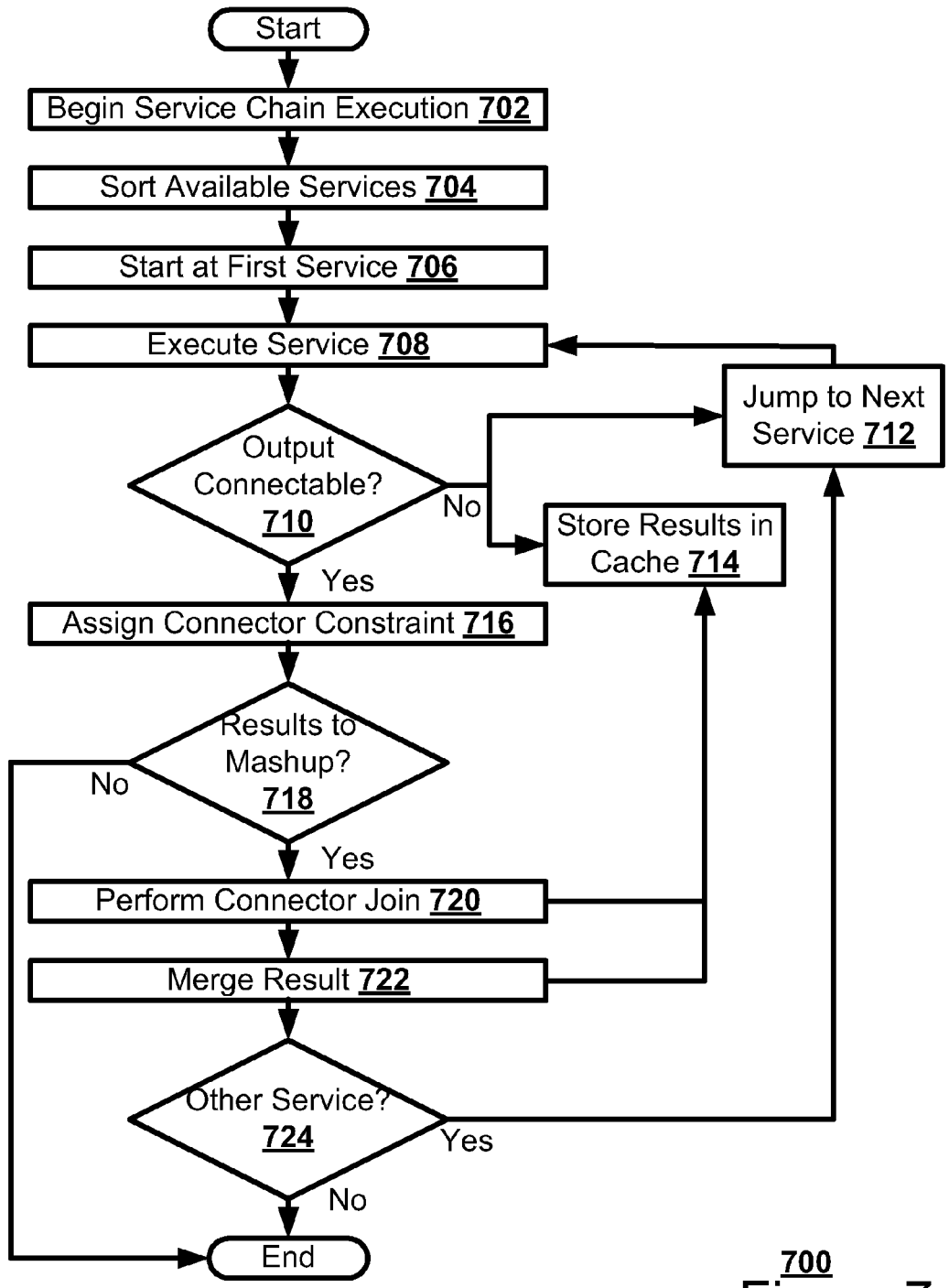
FIG. 7 illustrates, in a flowchart, one embodiment of a method for creating an optimized data response plan.

FIG. 7 illustrates, in a flowchart, one embodiment of a method 700 for optimizing a data service response plan. The service optimization module 412 may begin service chain execution (Block 702). The service optimization module 412 may sort the available data services 310 (Block 704). The service optimization module 412 may start at the first data service 310 (Block 706). The service optimization module 412 may execute the data service 310 (Block 708). If the output is not connectable (Block 710), the service optimization module 412 may jump to the next data service 310 (Block 712) while storing the results in a cache (Block 714). If the output is connectable (Block 710), the service optimization module 412 may assign a connector constraint to the data service 310 (Block 716). If the data service 310 produces results to mash up (Block 718), the service optimization module 412 may perform a connector join operation to the data service 310 (Block 720) while storing the results in a cache (Block 714). The service optimization module 412 may merge the results (Block 722) while storing the results in a cache (Block 714). If another data service 310 is present (Block 724), the service optimization module 412 may jump to the next data service 310 (Block 712).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A computerized method to automatically generate a data response regarding coordinated logistical movement of assets, comprising:
   receiving, with a processor, a data request from a user to coordinate the movement of at least two assets in a manufacturing or distribution chain;
   generating, with the processor, in real time a preliminary data response plan for the coordinated movement of the at least two assets based upon the received data request; and
   creating, with the processor, in real time an optimized data response plan by reorganizing the preliminary data response plan into a new order of execution to optimize a response time for an optimized data response regarding the coordinated movement of the at least two assets;
   the preliminary data response plan including
      a first data service query to a first data service to collect information on movement of a first asset of the at least two assets,
      a second data service query to a second data service to collect information on movement of a second asset of the at least two assets, and
      a connector describing a relationship between the first asset according to the first data service and the second asset according to the second data service, each of the first data service and the second data service being a data service that monitors and maintains data relating respectively to the first asset and the second asset in at least one of the manufacturing or distribution chain; and
   the optimized data response plan maintaining the relationship described by the connector.

2. The method of claim 1, further comprising:
   altering, with the processor, the connector to reflect the new order.

3. The method of claim 1, further comprising:
   executing, with the processor, the optimized data response plan; and
   providing the optimized data response as an output to the user.

4. The method of claim 1, further comprising:
   translating, with the processor, the received data request from a natural language data request to a Boolean data request.

5. The method of claim 1, further comprising:
   collecting, with the processor, a runtime metric on the optimized data response plan.

6. The method of claim 5, further comprising:
   optimizing, with the processor, a reorganization process based on the collected runtime metric.

7. The method of claim 1, further comprising:
   disposing of aged optimized data response plans.

8. A service optimization system for coordinating logistical movement of assets, comprising:
   a network interface that connects with a first data service and a second data service, each of the first data service and the second data service being a data service that monitors and maintains data relating respectively to a first asset and a second asset among a plurality of assets in a manufacturing or distribution chain; and
   a processor that executes:
      a service generation module to generate a preliminary data response plan for coordinated movement of at least two assets among the plurality of assets based upon a data request to coordinate the movement of the at least two assets in the manufacturing or distribution chain, the preliminary data response plan including
         a first data service query to a first data service to collect information on movement of the first asset,
         a second data service query to the second data service to collect information on movement of the second asset, and
         a connector describing a relationship between the first asset according to the first data service and the second asset according to the second data service; and
      a service optimization module that creates an optimized data response plan by reorganizing into a new order the first data service query and the second data service query while producing an optimized data response that maintains the relationship described by the connector.

9. The service optimization system of claim 8, wherein the processor creates the optimized data response plan in real time.

10. The service optimization system of claim 8, further comprising:
   a user interface that receives the data request from a user and provides the optimized data response to the user.

11. The service optimization system of claim 8, wherein the processor executes a service execution module that performs the optimized data response plan.

12. The service optimization system of claim 8, wherein the service optimization module alters the connector to reflect the new order.

13. The service optimization system of claim 8, wherein the processor executes a natural language parser to translate the data request from a natural language data request to a Boolean data request.

14. The service optimization system of claim 8, wherein the processor executes a runtime metrics module that collects a runtime metric on the optimized data response plan.

15. The service optimization system of claim 14, wherein the runtime metrics module provides the runtime metric to the service optimization module.

16. A non-transitory machine-readable medium having a set of instructions detailing a method to automatically generate a data response regarding coordinated logistical movement of assets stored thereon that, when executed by one or more processors, cause the one or more processors to perform the method, comprising:
   generating in real time a preliminary data response plan based upon a data request from a user to coordinate the movement of at least two assets in a manufacturing or distribution chain; the preliminary data response plan having
      a first data service query to a first data service to collect information on movement of a first asset of the at least two assets,
      a second data service query to a second data service to collect information on movement of a second asset of the at least two assets, and
      a connector describing a relationship between the first asset according to the first data service and the second asset according to the second data service, each of the first data service and the second data service being a data service that monitors and maintains data relating respectively to the first asset and the second asset in at least one of the manufacturing or distribution chain; and
   creating in real time an optimized data response plan by reorganizing into a new order the first data service query for the first asset and the second data service query for the second asset while maintaining the relationship described by the connector and then altering the connector to reflect the new order.

17. The non-transitory machine-readable medium of claim 16, the method further comprising:
executing the optimized data response plan; and
providing an optimized data response as an output to the user.

18. The non-transitory machine-readable medium of claim 16, the method further comprising:
translating the data request from a natural language data request to a Boolean data request.

19. The non-transitory machine-readable medium of claim 16, the method further comprising:
collecting a runtime metric on the optimized data response plan; and
optimizing a reorganization process based on the runtime metric.

* * * * *